US012344795B2

(12) United States Patent
Meng et al.

(10) Patent No.: US 12,344,795 B2
(45) Date of Patent: Jul. 1, 2025

(54) BIOLOGICAL AND CHEMICAL COMPOSITE BLOCKAGE REMOVING AGENT AND PREPARATION PROCESS AND USE THEREOF

(71) Applicants: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

(72) Inventors: Yong Meng, Shanghai (CN); Yingcheng Li, Shanghai (CN); Weidong Zhang, Shanghai (CN); Ou Sha, Shanghai (CN); Xinning Bao, Shanghai (CN); Jun Jin, Shanghai (CN); Xinyue Wu, Shanghai (CN)

(73) Assignees: China Petroleum & Chemical Corporation, Beijing (CN); Shanghai Research Institute of Petrochemical Technology, Sinopec, Shanghai (CN)

( * ) Notice: Subject to any disclaimer, the term of this patent is extended or adjusted under 35 U.S.C. 154(b) by 95 days.

(21) Appl. No.: 17/771,185

(22) PCT Filed: Oct. 23, 2020

(86) PCT No.: PCT/CN2020/123053
§ 371 (c)(1),
(2) Date: Apr. 22, 2022

(87) PCT Pub. No.: WO2021/078223
PCT Pub. Date: Apr. 29, 2021

(65) Prior Publication Data
US 2022/0363975 A1 Nov. 17, 2022

(30) Foreign Application Priority Data
Oct. 24, 2019 (CN) .......................... 201911015673.3

(51) Int. Cl.
*C09K 8/524* (2006.01)
*C09K 8/528* (2006.01)
(52) U.S. Cl.
CPC .............. *C09K 8/524* (2013.01); *C09K 8/528* (2013.01)
(58) Field of Classification Search
CPC ........ C09K 8/524; C09K 8/528; C09K 8/582; C09K 8/584
See application file for complete search history.

(56) References Cited

U.S. PATENT DOCUMENTS

| 2008/0167445 A1* | 7/2008 | Podella ................ C11D 3/38 530/350 |
| 2016/0272872 A1* | 9/2016 | Vo ............................ C09K 8/56 |
| 2019/0078016 A1 | 3/2019 | Southwell et al. |
| 2020/0032128 A1 | 1/2020 | Farmer et al. |

FOREIGN PATENT DOCUMENTS

| CA | 3052048 A1 | 8/2018 | |
| CN | 1337439 A | 2/2002 | |
| CN | 101839123 A | 9/2010 | |
| CN | 101839126 A | 9/2010 | |
| CN | 101839127 A | 9/2010 | |
| CN | 102212344 A | 10/2011 | |
| CN | 103058474 A | 4/2013 | |
| CN | 103642468 A | 3/2014 | |
| CN | 104232051 A | 12/2014 | |
| CN | 105462572 A | 4/2016 | |
| CN | 105863598 A | 8/2016 | |
| CN | 107312516 A | 11/2017 | |
| CN | 107556993 A | 1/2018 | |
| CN | 108373912 A | 8/2018 | |
| CN | 109943312 * | 6/2019 | |
| CN | 109943312 A | 6/2019 | |
| CN | 110325623 A | 10/2019 | |
| CN | 112119144 A | 12/2020 | |
| EP | 3290500 A1 * | 3/2018 | ............... A61K 8/39 |
| IN | 103614131 A | 3/2014 | |

(Continued)

OTHER PUBLICATIONS

Data sheet (downloaded on Jun. 7, 2024).*
Al-Wahaibi (Y. Al-Wahaibi et al, Injection of biosurfactant and chemical surfactant following hot water injection to enhance heavy oil recovery, Pet. Sci. 2016, 13, 100-109).*
Al-Wahaibi et al., "Injection of biosurfactant and chemical surfactant following hot water injection to enhance heavy oil recovery", Petroleum Science, China University of Petroleum (Beijing), Heidelberg, Dec. 10, 2015, vol. 13, No. 1, pp. 100-109.

(Continued)

*Primary Examiner* — Kumar R Bhushan
(74) *Attorney, Agent, or Firm* — Panitch Schwarze Belisario & Nadel LLP

(57) ABSTRACT

The present invention relates to a biological and chemical composite blockage removing agent and preparation process and use thereof, and mainly solves the problems that the existing blockage removing agents have poor blockage removal effect on organic blockages, cause damage to formations and oil-wells, produce serious environmental pollution, and corrode the equipment, pipelines, and the like. The problems can be well solved by using a technical solution of a biological and chemical composite blockage removing agent, which contains the following components in parts by mass: A. 10-50 parts of a biosurfactant; B. 5-20 parts of a chemical surfactant; wherein the chemical surfactant is an anionic-nonionic surfactant, and said technical solution can be used in the industrial production for removing the blockage in the oilfield, and reducing the injection pressure and increasing the injection.

8 Claims, 1 Drawing Sheet

(56) References Cited

FOREIGN PATENT DOCUMENTS

| | | |
|---|---|---|
| RU | 2671367 C2 | 10/2018 |
| SU | 651121 A1 | 3/1979 |
| WO | 2018/191172 A1 | 10/2018 |
| WO | 2019/219302 A1 | 11/2019 |

OTHER PUBLICATIONS

Trahan et al., "Summary of OECD 111 Tier 1 Testing: Hydrolysis of ALFOTERRA Surfactants as a Function of pH, Research Report", Sasol North America Incorporate, Jul. 13, 2010, pp. 1-8, XP93097753.

Extended European Search Report issued Nov. 14, 2023, by the European Patent Office in corresponding European Patent Application No. 20878847.1. (8 pages).

International Search Report (PCT/ISA/210) with an English translation, and Written Opinion (PCT/ISA/237) mailed on Jan. 4, 2021, by the China National Intellectual Property Administration as the International Searching Authority for International Application No. PCT/CN2020/123053. (12 pages).

Office Action issued on Mar. 9, 2023 by the Rospatent in corresponding Russian Patent Application No. 2022113618, with an English translation of the Office Action (15 pages).

Office Action (First Office Action) issued Aug. 17, 2021, by the State Intellectual Property Office of People's Republic of China in corresponding Chinese Patent Application No. 201911015673.3 and an English translation of the Office Action. (16 pages).

Office Action (Rejection Decision) issued May 7, 2022, by the State Intellectual Property Office of People's Republic of China in corresponding Chinese Patent Application No. 201911015673.3. (3 pages).

Office Action issued Nov. 23, 2023, by the Canadian Intellectual Property Office in corresponding Canadian Patent Application No. 3, 158,761. (5 pages).

Office Action (Second Office Action) issued on Jan. 18, 2022, by the State Intellectual Property Office of People's Republic of China in corresponding Chinese Patent Application No. 201911015673.3 and an English translation of the Office Action (9 pages).

Office Action (Rejection Decision) issued May 7, 2022, by the State Intellectual Property Office of People's Republic of China in corresponding Chinese Patent Application No. 201911015673.3, and a partial English translation of the Office Action (7 pages).

\* cited by examiner

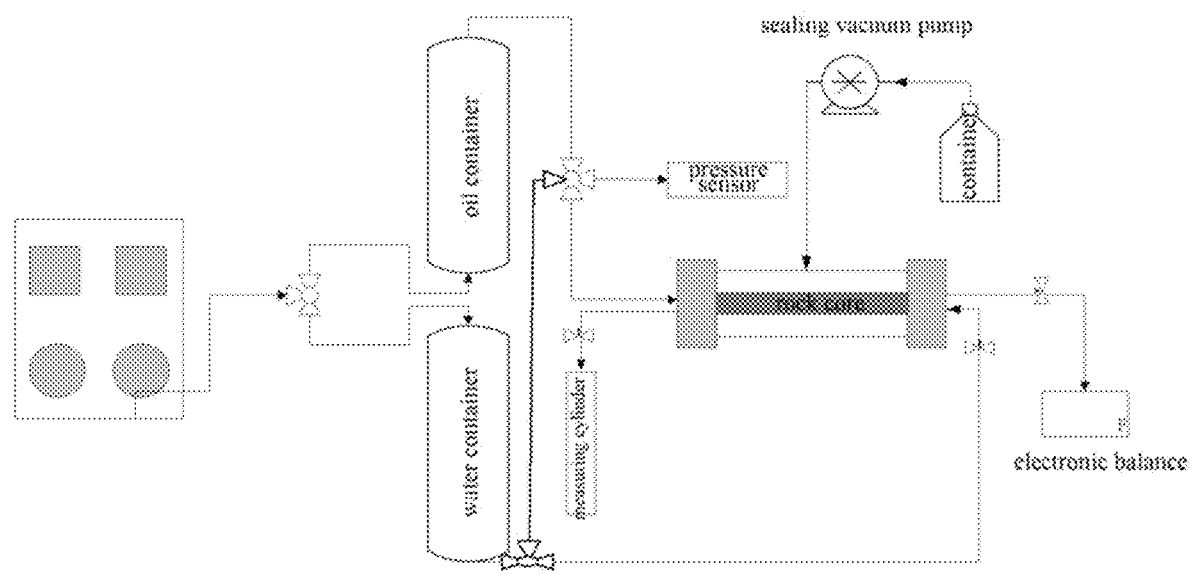

BIOLOGICAL AND CHEMICAL COMPOSITE BLOCKAGE REMOVING AGENT AND PREPARATION PROCESS AND USE THEREOF

TECHNICAL FIELD

The present invention relates to a blockage removing agent and preparation process and use thereof, in particular to a biological and chemical (B&C) composite blockage removing agent and preparation process and use thereof.

BACKGROUND TECHNOLOGY

Petroleum is an important non-renewable strategic resource and occupies an important position in global energy structure. It is also an irreplaceable basic raw material in the chemical industry and has great significance to national development and economic construction. With the increasing demand for energy in the world, how to continuously increase the crude oil output of the existing oilfields, meanwhile reducing the cost of the crude oil recovery and solving the practical problems in the current petroleum extraction process has become a major research topic of common concern in oil industries.

In the process of petroleum exploration, development, and continuous exploitation, due to a series of other reasons such as liquid pollution and mechanical impurity precipitation and blockage in the production process of well-drilling, well-completion, downhole operation, long-term oil extraction, and water injection, it is inevitable to increase the formation pressure in the zone near the well, reduce the permeability, and decrease the flow, resulting in the decline of the oil production amount and the water injection amount, or even the shutdown of the production. The problem of oil-well blockage has become a problem that cannot be ignored in the process of petroleum extraction. How to explore a correct, systematic, economical, and practical solution for removing the blockage of the oil well has currently become a topic of great research value and practical value, and is also an urgent need of the oilfield enterprises for realizing the purpose of reducing the pressure, increasing the injection and increasing the output in the exploitation process. The reasons for the blockage of oil wells can be roughly divided into two categories according to the different substances that cause the blockage and the different causes of the blockage, namely inorganic blockage and organic blockage. The substances that cause the inorganic blockage mainly include water scale, iron rust, iron slag, inorganic salts, clay, and the like. The substances that cause the organic blockage mainly include residual crude oil, paraffin, and asphaltenes, polymers and colloids, in-situ emulsions formed by emulsification, emulsions formed by post-injection fluids and oily substances, oily sludges, and the like.

Due to the complex mechanism for the blockage of the oil wells and the great variety of blockages, the existing blockage removal technology has a variable degree of deficiencies and defects in solving the actual blockage problem of the oil wells. In China, fracturing and acidizing are usually used to remove the blockage. The fractured formation has a good effect of creating fractures, but the investment for a single well is large, and the problem of water channeling is prone to occur. The blockage removal by acidizing is low in the cost and has a relatively good blockage removal effect on the inorganic blockage, but has a relatively small treatment radius, short validity period, limited pertinence, less remarkable effect on the organic blockage, and serious environmental pollution, and cause a varying degree of damage to the oilfield pipeline and the formation. Therefore, because of the shortcomings of the current domestic conventional blockage removal methods and the prominent problem of the organic blockage such as residual oil, the development of an effective blockage removing agent with a strong ability to solubilize the crude oil and significantly reduce the oil-water interfacial tension is of great significance for increasing the effect on the development by the water injection of the oilfield.

Biosurfactant is a substance with high surface activity mainly produced by microorganisms in the metabolic process. Compared with other surfactants, biosurfactant has more prominent surface activity and also has a variety of biological activity. Biosurfactant also has an incomparable green environmental protection property compared with chemical surfactants, which makes more and more attention be paid to its application prospect in the industrial field. At present, the main application of biosurfactants in the field of petroleum extraction is to increase the crude oil recovery rate. As a metabolite of microorganisms, biosurfactants play an important role in microbial enhanced crude oil recovery technology. The microbial enhanced crude oil recovery technology is to inject microbial bacteria liquor and nutrient substrates into the underground oil reservoir, or only inject a nutrient substance to activate the microorganisms in the oil reservoir, so that the microorganisms can be reproduced and multiplied in the oil reservoir. On the one hand, the direct effect of microorganisms on the crude oil is used to improve the characteristics of the crude oil, and to improve the fluidity of the crude oil in the pores and apertures of the formation. On the other hand, organic acids, polymers, gases, bio-surface active substances, and the like produced by the metabolism of microorganisms in oil reservoir are used to improve the crude oil recovery by reducing the interfacial tension between oil and water. Biosurfactants not only have outstanding surface and interface properties, but also can effectively improve the flowability of the crude oil, and they can still exist stably under extreme conditions, that is, high temperature, high salt, acidic and basic conditions, while the surface activity is not affected. The outstanding advantages of biosurfactants make them show potential application value in the field of removing the blockage in the oilfield.

SUMMARY OF THE INVENTION

As mentioned above, in the prior art, under the circumstance of avoiding the adverse effects on the environment, the existing oilfield blockage removal technology is insufficient in removing an organic blockage, and it is difficult to effectively achieve the purpose of reducing the injection pressure and increasing the injection and increasing the crude oil production.

Aiming at this prior art problem, the inventors of the present invention have made in-depth research, and as a result, have developed a new B&C composite blockage removing agent. The blockage removing agent can effectively solubilize the crude oil to form a microemulsion and greatly reduce the oil-water interfacial tension; meanwhile can reduce the oil-water interfacial tension and a good ability to solubilize the crude oil, and can effectively solve the problems of the increased water injection pressure caused by organic blockages such as the crude oil, and the decreased injection volume, improve the effect on the development by the water injection of the oilfield, and meanwhile reduce the consumption of the chemical surfactant, and reduce the environmental pollution, thereby completing the present invention.

Therefore, the first aspect of the present invention provides a B&C composite blockage removing agent, which contains the following components in parts by mass: A. 10-50 parts of a biosurfactant; and B. 5-20 parts of a chemical surfactant; wherein the chemical surfactant is an anionic-nonionic surfactant.

The second aspect of the present invention provides a process for preparing the above-mentioned B&C composite blockage removing agent of the present invention, which comprises the following steps: mixing a biosurfactant, a chemical surfactant, optionally a synergist, and optionally water to obtain the B&C composite blockage removing agent. The third aspect of the present invention is to provide the use of the above-mentioned B&C composite blockage removing agent of the present invention for removing the blockage of crude oil.

The fourth aspect of the present invention is to provide a blockage removing agent composition, which contains the above-mentioned B&C composite blockage removing agent of the present invention and a solvent.

INVENTION EFFECT

One of the components of the blockage removing agent of the present invention is a biosurfactant, which is an environment-friendly material and will not cause obvious pollution to the environment.

In the blockage removing agent of the present invention, the chemical surfactant is combined with the biosurfactant to reduce the additional amount of the chemical surfactant and reduce environmental pollution.

In the blockage removing agent of the present invention, the coordination of the chemical surfactant and the biosurfactant realizes the excellent synergistic effect, can effectively solubilize the crude oil to form the microemulsion, resulting in greatly reducing the oil-water interfacial tension, and meanwhile can reduce the oil-water interfacial tension and a good ability to solubilize the crude oil, and can effectively solve the problems of the increased water injection pressure caused by organic blockages such as the crude oil, and the decreased injection volume, and improve the effect on the development by the water injection of the oilfield.

Furthermore, in the blockage removing agent of the present invention, a synergist can be further added so that the above-mentioned effect of the solubilization and the blockage removal achieved by the blockage removing agent can be further improved.

BRIEF DESCRIPTION OF THE DRAWINGS

FIG. 1 is a schematic diagram of the physical simulation experiment apparatus.

DETAILED DESCRIPTION OF THE INVENTION

Reference will now be made in detail to the present embodiments of the present invention, but it should be understood that the scope of the invention is not limited by the embodiments, but is defined by the appended claims.

All publications, patent applications, patents, and other references mentioned in this specification are herein incorporated by reference in their entirety. Unless defined otherwise, all technical and scientific terms used herein have the same meanings as commonly understood by those skilled in the art to which this invention belongs. In case of conflict, the present specification, including definitions, will control.

When the specification derives a material, a substance, a process, a step, a device, an element, and the like with the expression such as "known to those skilled in the art", "prior art", or a synonym thereof, it is intended that the objects derived by such a prefix encompasses those having been conventionally used in the art at the time of filing this application, but also includes those which may not be so commonly used at present, but will become known in the art as being suitable for a similar purpose.

In the context of this specification, except for what is explicitly stated, any item or matter not mentioned is directly applicable to those known in the art without any changes. Moreover, any of the embodiments described herein can be freely combined with one or more other embodiments described herein, and the resulting technical solutions or technical ideas are regarded as part of the original disclosure or the original record of the present invention, and should not be regarded as new content that has not been disclosed or anticipated in this specification unless those skilled in the art believe that the combination is unreasonable.

In the present specification, the $C_{4-40}$ linear or branched alkyl represents a group obtained by removing one hydrogen atom from a linear or branched alkane having 4-40 carbon atoms without violating the valence, and preferably a group obtained by removing one hydrogen atom attached to one terminal carbon atom from the alkane. The $C_{4-40}$ linear or branched alkyl may include $C_{5-30}$ linear or branched alkyl, and may also include $C_{6-20}$ linear or branched alkyl. As the specific examples of these alkyl groups, butyl, pentyl, hexyl, heptyl, octyl, nonyl, decyl, undecyl, dodecyl, hexadecyl, octadecyl, eicosyl, docosyl, and isomers of these groups and the like can be enumerated, but not limited thereto. On the other hand, $C_{1-20}$ linear or branched alkyl and $C_{1-10}$ linear or branched alkyl are defined in the same way as the above-mentioned alkyl, except that the carbon atom numbers thereof are 1-20 and 1-10 respectively.

In the present specification, the $C_{4-40}$ monocyclic or polycyclic cycloalkyl represents a group obtained by removing one hydrogen atom from a monocyclic or polycyclic cycloalkane having 4-40 carbon atoms without violating the valence. It should be noted that the $C_{4-40}$ monocyclic or polycyclic cycloalkyl group includes the case where all carbon atoms are ring-forming carbon atoms, and also includes the case where an alkyl group or a cycloalkyl group is bonded to the cycloalkyl group as a substituent, provided that there is a monocyclic or polycyclic alkyl group in the group structure and the total carbon atom number is 4-40. The $C_{4-40}$ monocyclic or polycyclic cycloalkyl may include $C_{5-30}$ monocyclic or polycyclic cycloalkyl, and may also include $C_{6-20}$ monocyclic or polycyclic cycloalkyl, $C_{5-10}$ monocyclic or polycyclic cycloalkyl, $C_{5-8}$ monocyclic or polycyclic cycloalkyl, $C_{5-7}$ monocyclic or polycyclic cycloalkyl. As the specific examples of these monocyclic or polycyclic cycloalkyl groups, cyclobutyl, cyclopentyl, cyclohexyl, cycloheptyl, cyclooctyl, methylcyclohexyl, ethylcyclohexyl, propylcyclohexyl, octylcyclohexyl, and the like can be enumerated, but not limited thereto.

In the present invention, the $C_{4-40}$ linear or branched alkenyl refers to a group obtained by having at least one olefinic double bond, preferably having one double bond, in the above-mentioned $C_{4-40}$ linear or branched alkyl. The $C_{4-40}$ linear or branched alkenyl may include $C_{5-30}$ linear or branched alkenyl, and may also include $C_{6-10}$ linear or branched alkenyl. As the specific examples of these alkenyl groups, butenyl, 2-pentenyl, 1-hexenyl, 1-heptenyl, 1-octenyl, isomers of these groups and the like can be enumerated, but not limited thereto. On the other hand, $C_{2-10}$ linear or branched alkenyl and $C_{2-10}$ linear or branched alkenyl are defined in the same way as the above-mentioned alkenyl, except that the carbon atom numbers thereof are 2-20 and 2-10 respectively.

In the present specification, the $C_{6-40}$ aryl represents a group obtained by removing one hydrogen atom from an aromatic hydrocarbon having 6-40 carbon atoms without violating the valence. It should be noted that the $C_{6-40}$ aryl group includes the case where all carbon atoms are ring-forming carbon atoms of the aromatic ring, and also includes the case where an alkyl group or a cycloalkyl group is bonded to the aromatic ring as a substituent, provided that there is an aromatic ring in the group structure and the total carbon atom number is 6-40. The $C_{6-40}$ aryl may include $C_{6-30}$ aryl, and may also include $C_{6-20}$ aryl or $C_{6-10}$ aryl. As the specific examples of these aryl groups, phenyl, naphthyl, methylphenyl, dimethylphenyl, ethylphenyl, methylnaphthyl, 2-methylnaphthyl, 2-ethylnaphthyl and the like can be enumerated, but not limited thereto.

In the present invention, $C_{1-20}$ linear or branched alkylene represents a group obtained by removing two hydrogen atoms from a linear or branched alkane having 1-20 carbon atoms without violating the valence, and preferably a group obtained by removing each hydrogen atom attached to two terminal carbon atoms of the alkane. The $C_{1-20}$ linear or branched alkylene may include $C_{1-10}$ linear or branched alkylene, and may also include $C_{1-8}$ linear or branched alkylene. As the specific examples of these alkylene groups, methylene, ethylene, trimethylene, tetramethylene, pentamethylene, hexamethylene, isomers of these groups and the like can be enumerated, but not limited thereto.

In the present invention, the $C_{4-40}$ monocyclic or polycyclic cycloalkylene represents a group obtained by removing two hydrogen atoms from a monocyclic or polycyclic cycloalkane having 4-40 carbon atoms without violating the valence. Preferred is a group obtained by removing each hydrogen atom from two different carbon atoms. It should be noted that the $C_{4-40}$ monocyclic or polycyclic cycloalkylene group includes the case where all carbon atoms are ring-forming carbon atoms, and also includes the case where an alkyl group or a cycloalkyl group is bonded to the cycloalkyl group as a substituent, provided that there is a monocyclic or polycyclic alkyl group in the group structure and the total carbon atom number is 4-40. In addition, two bonding bonds can both be located at the monocyclic or polycyclic moiety, or both at the substituent of the monocyclic or polycyclic moiety, or one at the monocyclic or polycyclic moiety and the other at the substituent. The $C_{4-40}$ monocyclic or polycyclic cycloalkylene may include $C_{5-30}$ monocyclic or polycyclic cycloalkylene, and may also include $C_{6-20}$ monocyclic or polycyclic cycloalkylene. As the specific examples of these monocyclic or polycyclic cycloalkyl groups, 1,2-cyclopentanediyl, 1,2-cyclohexanediyl, 1,4-cycloheptanediyl, 1,4-cyclooctanediyl, 3-methylcyclohexane-1,2-diyl, 3-ethylcyclohexane-1,2-diyl, 3-propylcyclohexane-1,2-diyl and the like can be enumerated, but not limited thereto.

In the present invention, the $C_{4-40}$ linear or branched alkenylene refers to a group obtained by having at least one olefinic double bond, preferably having one double bond, in the above-mentioned $C_{4-40}$ linear or branched alkylene. The $C_{4-40}$ linear or branched alkenylene may include $C_{5-30}$ linear or branched alkenylene, and may also include $C_{6-20}$ linear or branched alkenylene. As the specific examples of these alkenylene groups, 2-butene-1,4-diyl, 2-pentene-1,4-diyl, 3-hexylene-1,6-diyl, 3-heptylene-1,7-diyl, 4-octylene-1,8-diyl, isomers of these groups and the like can be enumerated, but not limited thereto.

In the present specification, the $C_{6-40}$ arylene represents a group obtained by removing two hydrogen atoms from an aromatic hydrocarbon having 6-40 carbon atoms without violating the valence. It should be noted that the $C_{6-40}$ arylene group includes the case where all carbon atoms are ring-forming carbon atoms of the aromatic ring, and also includes the case where an alkyl group or a cycloalkyl group is bonded to the aromatic ring as a substituent, provided that there is an aromatic ring in the group structure and the total carbon atom number is 6-40. In addition, two bonding bonds can both be located at the aromatic ring, or both at the substituent of the aromatic ring, or one at the aromatic ring and the other at the substituent. The $C_{6-40}$ arylene may include $C_{6-30}$ arylene, and may also include $C_{6-20}$ arylene. As the specific examples of these aryl groups, 1,4-phenylene, 1,4-naphthylene, 2-methyl-1,4-phenylene, 2,3-dimethyl-1,4-phenylene, 2-ethyl-1,4-phenylene and the like can be enumerated, but not limited thereto.

In the present invention, "optionally substituted" refers to optionally substituted by one or more substituents selected from hydroxyl, $C_{1-20}$ (preferably $C_{1-10}$) linear or branched alkyl, $C_{5-10}$ (preferably $C_{5-8}$ or $C_{5-7}$) monocyclic or polycyclic cycloalkyl (such as cyclohexyl), $C_{2-20}$ (preferably $C_{2-10}$) linear or branched alkenyl and $C_{6-20}$ (preferably $C_{6-10}$) aryl.

In the present invention, the number of substituents that "optionally substitute" can be 0, or 1, 2, 3, 4, 5, 6, 7, or 8, subject to the upper limit of the number of the substituted groups that can be substituted.

Specifically, the present invention provides the following technical solutions.

A B&C composite blockage removing agent, which contains the following components in parts by mass: A. 10-50 parts of a biosurfactant; and B. 5-20 parts of a chemical surfactant; wherein the chemical surfactant is an anionic-nonionic surfactant.

In the present invention, the biosurfactant commonly used in the art can be used. It may be a commercial product, or it may be obtained by specific bacterial fermentation. In one embodiment of the present invention, the biosurfactant is at least one of lipopeptide, rhamnolipid, trehalose lipid, sophorolipid, gramicidin, alkylpolyglycoside, saponin, and cyclodextrin. In one embodiment of the present invention, the biosurfactant is preferably at least one of lipopeptide, rhamnolipid, and trehalose lipid.

In the blockage removing agent of the present invention, the chemical surfactant is selected from anionic-nonionic surfactants.

In one embodiment of the present invention, as the anionic-nonionic surfactant, it is preferably a hydrocarbyl polyoxyethylene polyoxypropylene ether acid salt.

In the present invention, the acid salt as the anionic part of the chemical surfactant is not particularly limited, and those commonly used in the art can be used. In one embodiment of the present invention, the acid salt is at least one of carboxylate salt, sulfate salt, phosphate salt, and sulfonate salt.

In one embodiment of the present invention, in the hydrocarbyl polyoxyethylene polyoxypropylene ether acid salt, the ethylene oxide unit (EO unit) number and the propylene oxide unit (PO unit) number are each independently an arbitrary number in the range of 0-60 and are not both 0 at the same time. That is, in the hydrocarbyl polyoxyethylene polyoxypropylene ether acid salt, at least one alkylene oxide unit is present. In one embodiment of the present invention, preferably the ethylene oxide unit (EO unit) number and the propylene oxide unit (PO unit) number are each independently 1-50, more preferably 1-40.

In one embodiment of the present invention, in the hydrocarbyl polyoxyethylene polyoxypropylene ether acid salt, the carbon atom number of the hydrocarbyl moiety except that the carbon atom number in the EO unit, the PO unit, and the acid group is 6-50, preferably 6-40, more preferably 6-30.

In one embodiment of the present invention, the hydrocarbyl polyoxyethylene polyoxypropylene ether acid salt has a general formula in the following structure:

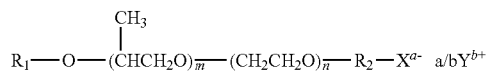

wherein $R_1$ is an optionally substituted $C_{4-40}$ (or $C_{5-30}$, or $C_{6-20}$) linear or branched alkyl, an optionally substituted $C_{4-40}$ (or $C_{5-30}$, or $C_{6-20}$) monocyclic or polycyclic cycloalkyl, an optionally substituted $C_{4-40}$ (or $C_{5-30}$, or $C_{6-20}$) linear or branched alkenyl, an optionally substituted $C_{6-40}$ (or $C_{6-30}$, or $C_{6-20}$) aryl, $R_2$ is an optionally substituted $C_{1-20}$ (or $C_{1-10}$, or $C_{1-8}$) linear or branched alkylene, an optionally substituted $C_{4-40}$ (or $C_{5-30}$, or $C_{6-20}$) monocyclic or polycyclic cycloalkylene, an optionally substituted $C_{4-40}$ (or $C_{5-30}$, or $C_{6-20}$) linear or branched alkenylene, an optionally substituted $C_{6-40}$ (or $C_{6-30}$, or $C_{6-20}$) arylene, the "optionally substituted" refers to optionally substituted by one or more substituents selected from hydroxyl, $C_{1-20}$ (preferably $C_{1-10}$) linear or branched alkyl, $C_{5-10}$ (preferably $C_{5-8}$ or $C_{5-7}$) monocyclic or polycyclic cycloalkyl (such as cyclohexyl), $C_{2-10}$ (preferably $C_{2-10}$) linear or branched alkenyl and $C_{6-20}$ (preferably $C_{6-10}$) aryl, the sum of the carbon atom number in $R_1$ and the carbon atom number in $R_2$ is 6-50, preferably 6-40, more preferably 6-30; m and n are each an arbitrary number in the range of 0-60 and are not both 0, X is one of carboxylate radical, sulfate radical, phosphate radical, and sulfonate radical, Y is a counter ion, a is the absolute value of the X's valence, b is the absolute value of the Y's valence.

In one embodiment of the present invention, the $R_1$ group is preferably an optionally substituted $C_{4-40}$ (or $C_{5-30}$, or $C_{6-20}$) linear or branched alkyl, an optionally substituted $C_{6-40}$ (or $C_{6-30}$, or $C_{6-20}$) aryl.

In one embodiment of the present invention, the $R_2$ group is preferably an optionally substituted $C_{1-20}$ (or $C_{1-10}$, or $C_{1-8}$) linear or branched alkylene, an optionally substituted $C_{6-40}$ (or $C_{6-30}$, or $C_{6-20}$) arylene.

In one embodiment of the present invention, "optionally substituted" preferably refers to being optionally substituted by one or two substituents selected from $C_{1-20}$ (preferably $C_{1-10}$) linear or branched alkyl, $C_{6-20}$ (preferably $C_{6-10}$) aryl.

In one embodiment of the present invention, in the hydrocarbyl polyoxyethylene polyoxypropylene ether acid salt, since EO units and PO units can be represented by average numbers, the numbers of m and n may be non-integers. At this time, m and n for example can be 0, 0.5, 1.2, 2.0, 2.5, 3.0, 3.5, 5.4, 7.5, 10.0, 15.0, 25.0, 30.2, 35.0, 40.0, 45.5, 50.5 or like. In the present invention, the counter ions commonly used in the art can be used as Y. In one embodiment of the present invention, Y is preferably any one of $Na^+$, $K^+$, $Mg^{2+}$, $Ca^{2+}$, and $NH_4^+$.

In the present invention, as the anionic-nonionic surfactant, a commercial product can be used, or it may be obtained through the synthesis with the methods well known in the art.

In one embodiment of the present invention, in parts by mass, preferably the biosurfactant comprises 20-50 parts, and the chemical surfactant comprises 5-15 parts, more preferably the biosurfactant comprises 30-50 parts, and the chemical surfactant comprises 5-15 parts.

In one embodiment of the present invention, in parts by mass, the B&C composite blockage removing agent further contains the component C: 1-30 parts, preferably 10-20 parts of a synergist.

In one embodiment of the present invention, the synergist is preferably a $C_2$-$C_6$ polyol; more preferably at least one of ethylene glycol, propylene glycol, and glycerol.

In one embodiment of the present invention, in parts by mass, the B&C composite blockage removing agent further can contain the component D: 0-84 parts by mass, preferably the balance of water.

In an embodiment of the present invention, the B&C composite blockage removing agent may further comprise other additives commonly used in the art, including but not limited to microorganisms that degrade the oil pollution.

In an embodiment of the present invention, the B&C composite blockage removing agent may further comprise other additives commonly used in the art, but comprise no microorganisms that degrade the oil pollution.

In one embodiment of the present invention, in the B&C composite blockage removing agent, relative to the total mass of the composite blockage removing agent, the content of the biosurfactant is 10%-50% (preferably 20%-50%, more preferably 30%-50%); the content of the chemical surfactant is 5%-20% (preferably 5%-15%); the content of the synergist is 1%-30% (preferably 10%-20%); the content of water is 0%-84% (preferably the balance). In one embodiment of the present invention, the blockage removing agent of the present invention has no special requirements for water when it is formulated, and the water can be deionized water or water containing inorganic minerals, and the water containing inorganic minerals can be tap water, oilfield formation water or oilfield injection water.

The present invention also provides a process for preparing the above-mentioned B&C composite blockage removing agent, which comprises the following steps: mixing a biosurfactant, a chemical surfactant, optionally a synergist, and optionally water to obtain the B&C composite blockage removing agent. In one embodiment of the present invention, in the above-mentioned preparation process of the B&C composite blockage removing agent, a part of the required water can be used as a solvent to dissolve the biosurfactant, the chemical surfactant, and optionally the synergist, and then the rest of water is added.

In one embodiment of the present invention, the preparation process is preferably performed in the following steps:

first, the required amount of the anionic-nonionic surfactant is added to water and completely dissolved by stirring; the required amount of the synergist is added to the completely dissolved anionic-nonionic surfactant solution, and mixed evenly by stirring; then the required amount of the biosurfactant is added, and mixed evenly by stirring; optionally the remaining water is supplemented to reach the required amount of water, and mixed evenly by stirring to obtain the B&C composite blockage removing agent.

The present invention also provides a blockage removing agent composition, which comprises a solvent and the above-mentioned B&C composite blockage removing agent of the present invention, wherein relative to the total mass of the composition, in terms of the total mass concentration of the biosurfactant and the chemical surfactant, the concentration of the B&C composite blockage removing agent is 0.001%-5%, preferably 0.005%-2%.

In one embodiment of the present invention, the solvent is selected from crude oil, organic compounds, or water. The solvent is preferably water.

The present invention also provides the use of the B&C composite blockage removing agent of the present invention for removing the blockage of crude oil.

In one embodiment of the present invention, in said use, in terms of the total mass concentration of the biosurfactant and the chemical surfactant, the concentration of the B&C composite blockage removing agent when in use is 0.001%-5%, preferably 0.005%-2%.

In one embodiment of the present invention, the use is not particularly limited and can be utilized by those skilled in the art according to the existing blockage removal technology. For example, a solution of the B&C composite blockage removing agent is formulated according to the weight percentage of the raw material components, diluted with water to an effective concentration (in terms of the total mass of two components, the biosurfactant, and the chemical surfactant) of 0.001%-5%, preferably 0.005%-2%, and then a certain amount of the resulting solution is injected into a water-well or an oil-well, but not limited thereto.

In one embodiment of the present invention, in the use of the blockage removing agent of the present invention, at first, any one of the biosurfactant and the chemical surfactant is added, and then another one is added. For example, at first, the biosurfactant can be added to a water-well or an oil-well, and then the chemical surfactant is added; or at first, the chemical surfactant can be added to a water-well or an oil-well, and then the biosurfactant is added. In one embodiment of the present invention, the biosurfactant and the chemical surfactant are added at the same time in the use of the blockage removing agent of the present invention.

In the B&C composite blockage removing agent of the present invention, a combination of the biosurfactant and the chemical surfactant is used. Further, the present invention provides a combination of the biosurfactant, the chemical surfactant, and the synergist. All of these combinations produce a good synergistic effect. The interaction between components makes the blockage removing agent effectively solubilize the crude oil, reduce the oil-water interfacial tension to an ultra-low level, and significantly reduce the oil-water interface interaction, thereby reducing the oil-water flow resistance in the formation, and playing a good role in removing the blockage and being able to effectively reduce the injection pressure.

The B&C composite blockage removing agent of the present invention can be used for the blockage removing construction in oilfields. After injecting the blockage removing agent, the residual oil in the water-well or the oil-well can be effectively solubilized. The solubilization parameter can reach 20 or higher, and the oil-water interfacial tension can be reduced to the order of magnitude of about $10^{-4}$ mN/m, significantly reducing the oil-water interface interaction, thereby reducing the oil-water flow resistance in the formation. With the solubilization of the residual oil and the ultra-low interfacial tension, the effect on the development by the water injection of the oilfield can be effectively improved. The physical simulation experiment proves that the blockage removing agent of the present invention can reduce the injection pressure by 20% or higher, or even 30% or higher, and has achieved a relatively good technical effect.

In one embodiment of the present invention, the main components of the B&C composite blockage removing agent of the present invention can be analyzed and detected by the following method.

The lipopeptide can be analyzed by the combined use of high-performance liquid chromatography-mass spectrometry: the reversed $C_{18}$ chromatographic separation column is used as the chromatographic column; the mobile phase is subjected to gradient elution with acetonitrile (A)-0.05% aqueous trifluoroacetic acid solution (B), the conditions for the gradient elution comprise 0-20 min, 80% A-100% A, and 20-30 min, 100% A; the ESI+ ion mode is used for the mass spectrometry, and the scanning range is 150-1500.

The hydrocarbyl polyoxyethylene polyoxypropylene ether acid salt can be analyzed by the combined use of high-performance liquid chromatography-mass spectrometry: the reversed $C_{18}$ chromatographic separation column is used as the chromatographic column; the mobile phase is eluted with methanol-water-acetic acid ammonium acetate buffer salt, the mass fractions of three components in the mobile phase are 65%, 35%, and 5%, respectively; the ESI+ ion mode is used for the mass spectrometry, and the scanning range is 150-1500.

The rhamnolipid can be analyzed by the combined use of high-performance liquid chromatography-mass spectrometry: the reversed $C_{18}$ chromatographic separation column is used as the chromatographic column; the mobile phase is subjected to gradient elution with acetonitrile (A)-acetic acid (B), the conditions for the gradient elution comprise 0-3 min, 50% B, 3-12 min, 50% B-0% B, 12-16 min, 0% B, 16-17 min, 0% B-50% B, 17-20 min, 50% B; the ESI+ ion mode is used for the mass spectrometry, and the scanning range is 150-1500.

The rhamnolipid can be analyzed by the combined use of high-performance liquid chromatography-mass spectrometry: the reversed $C_{18}$ chromatographic separation column is used as the chromatographic column; the mobile phase is subjected to gradient elution with 0.5% aqueous formic acid solution (A)-acetonitrile (B), the conditions for the gradient elution comprise 0-5 min, 50% B, 5-30 min, 50% B-60% B, 30-60 min, 60% B-100% B; the ESI+ ion mode is used for the mass spectrometry, and the scanning range is 150-1500.

EXAMPLES

To better understand the present invention, the content of the present invention is further described below in conjunction with the examples, but the content of the present invention is not limited to the following examples.

Example 1

According to the following weight percentages, 100 g of a blockage removing agent was prepared:

A. lipopeptide: 30 g, commercially available from KANEKA CORPORATION JAPAN;

B. Sodium dodecyl polyoxyethylene polyoxypropylene ether carboxylate ($C_{12}H_{25}O(PO)_{12}(EO)_{24}CH_2COONa$): 10 g, self-manufactured;

C. Ethylene glycol: 10 g;

D. The balance of water.

Preparation process: to a beaker was added a predetermined amount of sodium dodecyl polyoxyethylene polyoxypropylene ether carboxylate, then added a half of a predetermined amount of the make-up water, and the resulting mixture was completely dissolved by stirring; to the completely dissolved surfactant solution was added a predetermined amount of ethylene glycol, and the resulting mixture was mixed evenly by stirring; a predetermined amount of lipopeptide was added and the resulting mixture was stirred evenly; another half of the make-up water that was remained was supplemented, and the resulting mixture was mixed evenly by stirring.

Effect evaluation:

Interfacial tension: A TX-500C spinning drop interfacial tensiometer was used to measure the oil-water interfacial tensions of the crude oil samples from the Shengli Oil Production Plant of Shengli Oilfield with the blockage removing agents having effective mass concentrations of 0.005%, 0.05%, 0.5%, and 2% respectively. The measuring temperature was 80° C., the water was the simulated formation water, and the mineralization degree was 29000 mg/L. The oil-water interfacial tensions of different concentrations of the blockage removing agents and the crude oil were: $9\times10^{-4}$ mN/m, $5\times10^{-4}$ mN/m, $2\times10^{-4}$ mN/m, and $1\times10^{-4}$ mN/m.

Solubilization parameters: 2 mL of blockage removing agents having effective concentrations of 0.1%, 0.5%, 1.0%, and 2.0% respectively were placed in straight screw glass tubes. 2 mL of crude oil samples were added respectively. The lids were tightened up. The contents in the glass tubes were mixed evenly, and placed in a constant temperature air bath at 80° C. to stand for 7 days for equilibration. The crude oil solubilization parameters were calculated to be 28, 29, 33, and 35 respectively. The crude oil solubilization parameter was the mass of the crude oil solubilized by the unit mass of surfactant. In the experiment, due to the presence of the surfactant in the blockage removing agent system, the crude oil could be solubilized into the aqueous phase. By measuring the volume change of the crude oil phase before and after the experiment, the mass of the crude oil solubilized into the aqueous phase was obtained, and then the crude oil solubilization parameter was obtained by calculation.

Physical simulation experiment: The schematic diagram of the experimental apparatus is shown in FIG. 1. The core for the physical simulation experiment was firstly saturated with formation water, and then water in the core was displaced with crude oil until no water was driven out to obtain the saturated core for the physical simulation experiment. In the experiment, the oil in the saturated cores was firstly displaced with formation water until no crude oil was driven out, and the injection pressure and the core permeability data were recorded at this time; then 1PV of the blockage removing agent solutions having different concentrations were injected, and the cores were aged at the oil reservoir temperature for 4 days; finally, the oil in the cores was displaced with formation water until no crude oil was driven out; the injection pressure and the permeability were recorded. The water injection pressures of the oil-saturated cores before and after the injection of the blockage removing agent solutions were measured, and the reductions in the water injection pressures after injecting the blockage removing agent solutions were calculated. In case the effective concentrations of the blockage removing agents were 0.1%, 0.5%, 1.0%, and 2.0% respectively, the water injection pressure reduction proportions were 33%, 39%, 40%, and 43% respectively.

Example 2

According to the following weight percentages, 100 g of a blockage removing agent was prepared:

A. lipopeptide: 30 g, commercially available from KANEKA CORPORATION JAPAN;

B. $C_{16}H_{33}O(PO)_{22}(EO)_{36}CH_2COOK$: 10 g, self-manufactured;

C. propylene glycol: 10 g;

D. the balance of water.

The preparation process was identical to that in Example 1

The effect evaluation method was identical to that in Example 1: the oil-water interfacial tensions of different concentrations of the blockage removing agents and the crude oil were $8\times10^{-4}$ mN/m, $5\times10^{-4}$ mN/m, $3\times10^{-4}$ mN/m, and $2\times10^{-4}$ mN/m respectively; the crude oil solubilization parameters were 22, 25, 30, and 33 respectively; and the water injection pressure reduction ratios were 31%, 33%, 36%, and 42% respectively.

Example 3

According to the following weight percentages, 100 g of a blockage removing agent was prepared:

A. lipopeptide: 30 g, commercially available from KANEKA CORPORATION JAPAN;

B. $C_{22}H_{45}O(PO)_{30}(EO)_{60}C_2H_4COONH_4$: 10 g, self-manufactured;

C. glycerol: 10 g;

D. the balance of water.

The preparation process was identical to that in Example 1

The effect evaluation method was identical to that in Example 1: the oil-water interfacial tensions of different concentrations of the blockage removing agents and the crude oil were $9\times10^{-4}$ mN/m, $6\times10^{-4}$ mN/m, $4\times10^{-4}$ mN/m, and $2\times10^{-4}$ mN/m respectively; the crude oil solubilization parameters were 24, 26, 30, and 31 respectively; and the water injection pressure reduction ratios were 30%, 30%, 32%, and 33% respectively.

Example 4

According to the following weight percentages, 100 g of a blockage removing agent was prepared:

A. lipopeptide: 30 g, commercially available from KANEKA CORPORATION JAPAN;

B. $C_{12}H_{25}O(PO)_6(EO)_{18}C_5H_{10}SO_4Na$: 10 g, self-manufactured;

C. ethylene glycol: 1 g;

D. the balance of water.

The preparation process was identical to that in Example 1

The effect evaluation method was identical to that in Example 1: the oil-water interfacial tensions of different concentrations of the blockage removing agents and the crude oil were $9\times10^{-4}$ mN/m, $7\times10^{-4}$ mN/m, $5\times10^{-4}$ mN/m, and $3\times10^{-4}$ mN/m respectively; the crude oil solubilization parameters were 20, 22, 27, and 30 respectively; and the water injection pressure reduction ratios were 30%, 33%, 36%, and 36% respectively.

Example 5

According to the following weight percentages, 100 g of a blockage removing agent was prepared:

A. lipopeptide: 30 g, commercially available from KANEKA CORPORATION JAPAN;

B. $C_{12}H_{25}O(PO)_1(EO)_{28}CH_2SO_3Na$: 10 g, self-manufactured;

C. ethylene glycol: 30 g;

D. the balance of water.

The preparation process was identical to that in Example 1

The effect evaluation method was identical to that in Example 1: the oil-water interfacial tensions of different concentrations of the blockage removing agents and the crude oil were $9\times10^{-4}$ mN/m, $6\times10^{-4}$ mN/m, $4\times10^{-4}$ mN/m, and $3\times10^{-4}$ mN/m respectively; the crude oil solubilization parameters were 24, 25, 29, and 30 respectively; and the water injection pressure reduction ratios were 31%, 32%, 35%, and 35% respectively.

Example 6

According to the following weight percentages, 100 g of a blockage removing agent was prepared:

A. lipopeptide: 10 g, commercially available from KANEKA CORPORATION JAPAN;

B. $C_{12}H_{25}O(PO)_{16}C_{10}H_{20}OONa$: 10 g, self-manufactured;

C. ethylene glycol: 10 g;

D. the balance of water.

The preparation process was identical to that in Example 1

The effect evaluation method was identical to that in Example 1: the oil-water interfacial tensions of different concentrations of the blockage removing agents and the crude oil were $9\times10^{-4}$ mN/m, $8\times10^{-4}$ mN/m, $6\times10^{-4}$ mN/m, and $6\times10^{-4}$ mN/m respectively; the crude oil solubilization parameters were 20, 21, 25, and 26 respectively; and the water injection pressure reduction ratios were 30%, 30%, 31%, and 32% respectively.

Example 7

According to the following weight percentages, 100 g of a blockage removing agent was prepared:

A. lipopeptide: 50 g, commercially available from KANEKA CORPORATION JAPAN;

B. $C_{12}H_{25}O(EO)_{22}C_3H_6COONa$: 10 g, self-manufactured;

C. ethylene glycol: 10 g;

D. the balance of water.

The preparation process was identical to that in Example 1

The effect evaluation method was identical to that in Example 1: the oil-water interfacial tensions of different concentrations of the blockage removing agents and the crude oil were $8\times10^{-4}$ mN/m, $7\times10^{-4}$ mN/m, $7\times10^{-4}$ mN/m, and $6\times10^{-4}$ mN/m respectively; the crude oil solubilization parameters were 26, 26, 29, and 30 respectively; and the water injection pressure reduction ratios were 30%, 31%, 33%, and 34% respectively.

Example 8

According to the following weight percentages, 100 g of a blockage removing agent was prepared:

A. lipopeptide: 30 g, commercially available from KANEKA CORPORATION JAPAN;

B. $C_{12}H_{25}O(PO)_8(EO)_{16}CH_2COONa$: 5 g, self-manufactured;

C. ethylene glycol: 10 g;

D. the balance of water.

The preparation process was identical to that in Example 1

The effect evaluation method was identical to that in Example 1: the oil-water interfacial tensions of different concentrations of the blockage removing agents and the crude oil were $8\times10^{-4}$ mN/m, $6\times10^{-4}$ mN/m, $2\times10^{-4}$ mN/m, and $2\times10^{-4}$ mN/m respectively; the crude oil solubilization parameters were 23, 25, 30, and 33 respectively; and the water injection pressure reduction ratios were 32%, 33%, 37%, and 40% respectively.

Example 9

According to the following weight percentages, 100 g of a blockage removing agent was prepared:

A. lipopeptide: 30 g, commercially available from KANEKA CORPORATION JAPAN;

B. $C_{12}H_{25}O(PO)_{36}(EO)_{48}CH_2COONa$: 20 g, self-manufactured;

C. ethylene glycol: 10 g;

D. the balance of water.

The preparation process was identical to that in Example 1

The effect evaluation method was identical to that in Example 1: the oil-water interfacial tensions of different concentrations of the blockage removing agents and the crude oil were $8\times10^{-4}$ mN/m, $4\times10^{-4}$ mN/m, $3\times10^{-4}$ mN/m, and $2\times10^{-4}$ mN/m respectively; the crude oil solubilization parameters were 25, 28, 33, and 34 respectively; and the water injection pressure reduction ratios were 34%, 36%, 38%, and 38% respectively.

Example 10

According to the following weight percentages, 100 g of a blockage removing agent was prepared:

A. lipopeptide: 30 g, commercially available from KANEKA CORPORATION JAPAN;

B. $C_{12}H_{25}(C_6H_4)O(PO)_{12}(EO)_{24}CH_2COONa$: 10 g, self-manufactured;

C. ethylene glycol: 10 g;

D. the balance of water.

The preparation process was identical to that in Example 1

The effect evaluation method was identical to that in Example 1: the oil-water interfacial tensions of different concentrations of the blockage removing agents and the crude oil were $6\times10^{-4}$ mN/m, $3\times10^{-4}$ mN/m, $1\times10^{-4}$ mN/m, and $1\times10^{-4}$ mN/m respectively; the crude oil solubilization parameters were 30, 33, 35, and 36 respectively; and the water injection pressure reduction ratios were 35%, 38%, 42%, and 45% respectively.

Example 11

According to the following weight percentages, 100 g of a blockage removing agent was prepared:

A. lipopeptide: 30 g, commercially available from KANEKA CORPORATION JAPAN;

B. $C_{12}H_{25}(PO)_{12}(EO)_{24}(C_6H_4)CH_2COONa$: 10 g, self-manufactured;

C. ethylene glycol: 10 g;
D. the balance of water.

The preparation process was identical to that in Example 1

The effect evaluation method was identical to that in Example 1: the oil-water interfacial tensions of different concentrations of the blockage removing agents and the crude oil were $8\times10^{-4}$ mN/m, $3\times10^{-4}$ mN/m, $2\times10^{-4}$ mN/m, and $1\times10^{-4}$ mN/m respectively; the crude oil solubilization parameters were 28, 31, 33, and 34 respectively; and the water injection pressure reduction ratios were 30%, 33%, 38%, and 39% respectively.

Example 12

According to the following weight percentages, 100 g of a blockage removing agent was prepared:
A. rhamnolipid: 30 g, commercially available from Evonik Industries AG;
B. $C_{12}H_{25}O(PO)_{12}(EO)_{24}CH_2COONa$: 10 g;
C. ethylene glycol: 10 g;
D. the balance of water.

The preparation process was identical to that in Example 1

The effect evaluation method was identical to that in Example 1: the oil-water interfacial tensions of different concentrations of the blockage removing agents and the crude oil were $9\times10^{-4}$ mN/m, $6\times10^{-4}$ mN/m, $4\times10^{-4}$ mN/m, and $3\times10^{-4}$ mN/m respectively; the crude oil solubilization parameters were 20, 21, 24, and 29 respectively; and the water injection pressure reduction ratios were 30%, 31%, 33%, and 36% respectively.

Example 13

According to the following weight percentages, 100 g of a blockage removing agent was prepared:
A. trehalose lipid: 30 g, commercially available from Xi'an Brilliant Chemical Engineering Co. Ltd.;
B. $C_{12}H_{25}O(PO)_{12}(EO)_{24}CH_2COONa$: 10 g;
C. ethylene glycol: 10 g;
D. the balance of water.

The preparation process was identical to that in Example 1

The effect evaluation method was identical to that in Example 1: the oil-water interfacial tensions of different concentrations of the blockage removing agents and the crude oil were $9\times10^{-4}$ mN/m, $7\times10^{-4}$ mN/m, $5\times10^{-4}$ mN/m, and $5\times10^{-4}$ mN/m respectively; the crude oil solubilization parameters were 20, 20, 24, and 30 respectively; and the water injection pressure reduction ratios were 30%, 30%, 34%, and 35% respectively.

Example 14

According to the following weight percentages, 100 g of a blockage removing agent was prepared:
A. lipopeptide: 30 g, commercially available from KANEKA CORPORATION JAPAN;
B. $C_{12}H_{25}O(PO)_{12}(EO)_{24}CH_2COONa$: 10 g, self-manufactured;
C. the balance of water.

The preparation process was identical to that in Example 1

The effect evaluation method was identical to that in Example 1: the oil-water interfacial tensions of different concentrations of the blockage removing agents and the crude oil were $4\times10^{-3}$ mN/m, $1\times10^{-3}$ mN/m, $8\times10^{-4}$ mN/m, and $7\times10^{-4}$ mN/m respectively; the crude oil solubilization parameters were 24, 25, 25, and 28 respectively; and the water injection pressure reduction ratios were 21%, 26%, 29%, and 30% respectively.

Comparative Example 1

According to the following weight percentages, 100 g of a blockage removing agent was prepared:
A. lipopeptide: 40 g, commercially available from KANEKA CORPORATION JAPAN;
B. ethylene glycol: 10 g;
C. the balance of water.

The preparation process was identical to that in Example 1

The effect evaluation method was identical to that in Example 1: the oil-water interfacial tensions of different concentrations of the blockage removing agents and the crude oil were $9\times10^{-2}$ mN/m, $6\times10^{-2}$ mN/m, $4\times10^{-2}$ mN/m, and $3\times10^{-2}$ mN/m respectively; the crude oil solubilization parameters were 9, 12, 13, and 15 respectively; and the water injection pressure reduction ratios were 11%, 12%, 14%, and 15% respectively.

Comparative Example 2

According to the following weight percentages, 100 g of a blockage removing agent was prepared:
A. $C_{12}H_{25}O(PO)_{12}(EO)_{24}CH_2COONa$: 40 g, self-manufactured;
B. ethylene glycol: 10 g;
C. the balance of water.

The preparation process was identical to that in Example 1

The effect evaluation method was identical to that in Example 1: the oil-water interfacial tensions of different concentrations of the blockage removing agents and the crude oil were $5\times10^{-2}$ mN/m, $2\times10^{-2}$ mN/m, $9\times10^{-3}$ mN/m, and $9\times10^{-3}$ mN/m respectively; the crude oil solubilization parameters were 11, 11, 12, and 12 respectively; and the water injection pressure reduction ratios were 10%, 13%, 14%, and 14% respectively.

Comparative Example 3

According to the following weight percentages, 100 g of a blockage removing agent was prepared:
A. lipopeptide: 30 g, commercially available from KANEKA CORPORATION JAPAN;
B. dodecyl polyoxyethylene polyoxypropylene ether $C_{12}H_{25}O(PO)_{12}(EO)24H$: 5 g, self-manufactured;
C. sodium dodecylbenzene sulfonate: 5 g, commercially available from Shanghai Aladdin Biochemical Technology Co., Ltd;
D. ethylene glycol: 10 g;
E. the balance of water.

The preparation process was identical to that in Example 1

The effect evaluation method was identical to that in Example 1: the oil-water interfacial tensions of different concentrations of the blockage removing agents and the crude oil were $1\times10^{-2}$ mN/m, $1\times10^{-2}$ mN/m, $9\times10^{-3}$ mN/m, and $8\times10^{-3}$ mN/m respectively; the crude oil solubilization parameters were 13, 15, 16, and 16 respectively; and the water injection pressure reduction ratios were 13%, 15%, 17%, and 18% respectively.

It should be noted by those skilled in the art that the described embodiments of the present invention are merely exemplary, and various other substitutions, changes, and improvements may be made within the scope of the present invention. Therefore, the present invention is not limited to the above-described embodiments, but only by the claims.

The invention claimed is:

1. A biological and chemical (B&C) composite blockage removing agent, which comprises the following components in parts by mass:
   A. 10-50 parts of a biosurfactant, the biosurfactant being at least one selected from lipopeptide, rhamnolipid, trehalose lipid, sophorolipid, gramicidin, alkyl polyglycoside, saponin, and cyclodextrin;
   B. 5-20 parts of a chemical surfactant;
   C. 1-30 parts of a synergist; the synergist being at least one of ethylene glycol, and glycerol; and
   D. more than 0 to 84 arts of water as a solvent,
   wherein the chemical surfactant is an anionic-nonionic surfactant;
   the anionic-nonionic surfactant is a hydrocarbyl polyoxyethylene polyoxypropylene ether acid salt, and the hydrocarbyl polyoxyethylene polyoxypropylene ether acid salt has a general formula in the following structure:

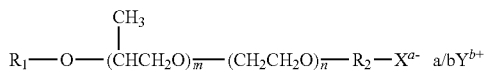

wherein $R_1$ is an optionally substituted $C_{4-40}$ linear or branched alkyl, an optionally substituted $C_{4-40}$ monocyclic or polycyclic cycloalkyl, an optionally substituted $C_{4-40}$ linear or branched alkenyl, an optionally substituted $C_{6-40}$ aryl, $R_2$ is an optionally substituted $C_{1-20}$ linear or branched alkylene, an optionally substituted $C_{4-40}$ monocyclic or polycyclic cycloalkylene, an optionally substituted $C_{4-40}$ linear or branched alkenylene, an optionally substituted $C_{6-40}$ arylene, the "optionally substituted" refers to optionally substituted by one or more substituents selected from hydroxyl, $C_{1-20}$ linear or branched alkyl, $C_{5-10}$ monocyclic or polycyclic cycloalkyl, $C_{2-20}$ linear or branched alkenyl and $C_{6-20}$ aryl, a sum of a carbon atom number in $R_1$ and a carbon atom number in $R_2$ is 6-50; m and n are each an arbitrary number in a range of 0-60 and are not both 0 at the same time, X is one of carboxylate radical, sulfate radical, phosphate radical, and sulfonate radical, Y is one of $Na^+$, $K^+$, $Mg^{2+}$, $Ca^{2+}$, and $NH_4^+$, a is an absolute value of X's valence, b is an absolute value of Y's valence.

2. The B&C composite blockage removing agent according to claim 1, wherein in the hydrocarbyl polyoxyethylene polyoxypropylene ether acid salt, the carbon atom number of the hydrocarbyl moiety except the carbon atom number in the EO unit, the PO unit, and the acid group is 6-50.

3. A process for preparing the B&C composite blockage removing agent according to claim 1, which comprises the following steps:
   mixing a biosurfactant, a chemical surfactant, optionally a synergist, and water to obtain the B&C composite blockage removing agent.

4. A method for removing the blockage of crude oil, comprising utilizing the B&C composite blockage removing agent according to claim 1.

5. The method according to claim 4, wherein, in terms of the total mass concentration of the biosurfactant and the chemical surfactant, the concentration of the B&C composite blockage removing agent when in use is 0.001%-5%.

6. The process according to claim 3, wherein at first, any one of the biosurfactant and the chemical surfactant is added, and then another one is added, or the biosurfactant and the chemical surfactant are both added at the same time.

7. A blockage removing agent composition, which contains the B&C composite blockage removing agent according to claim 1, relative to the total mass of the composition, in terms of the total mass concentration of the biosurfactant and the chemical surfactant, the concentration of the B&C composite blockage removing agent is 0.001%-5%.

8. A method for removing the blockage of crude oil, comprising utilizing the blockage removing agent composition according to claim 7.

* * * * *